United States Patent [19]

Beard

[11] Patent Number: 4,802,422

[45] Date of Patent: Feb. 7, 1989

[54] WORK SURFACE GANGING CLIP

[75] Inventor: Michael D. Beard, Hudsonville, Mich.

[73] Assignee: Herman Miller, Inc., Zeeland, Mich.

[21] Appl. No.: 96,665

[22] Filed: Sep. 15, 1987

Related U.S. Application Data

[63] Continuation of Ser. No. 860,095, May 6, 1986.

[51] Int. Cl.⁴ ............................................. A47B 57/00
[52] U.S. Cl. ..................................... 108/64; 108/114; 403/306; 403/338; 403/387
[58] Field of Search ........................... 108/64, 67, 114; 248/228, 72; 403/387, 389, 338, 313, 306, 309; 52/578, 580, 581, 582, 583, 584

[56] References Cited

U.S. PATENT DOCUMENTS

| | | | |
|---|---|---|---|
| 893,378 | 7/1908 | Rosenfeld | 248/228 |
| 1,203,752 | 11/1916 | Le Clair | 108/114 X |
| 1,976,595 | 10/1934 | Asleson et al. | 248/228 |
| 2,609,582 | 9/1952 | Kindorf et al. | 403/387 |
| 2,848,289 | 8/1958 | Page | 108/64 X |
| 3,015,897 | 1/1962 | Hopp | 248/231.2 X |
| 3,267,881 | 8/1966 | Saggione | 108/64 X |
| 3,276,800 | 10/1966 | Loudon et al. | 248/228 |

FOREIGN PATENT DOCUMENTS

| | | | |
|---|---|---|---|
| 86663 | 6/1921 | Austria | 108/64 |
| 6223 | of 1832 | United Kingdom | 108/114 |

*Primary Examiner*—Peter A. Aschenbrenner
*Attorney, Agent, or Firm*—Varnum, Riddering, Schmidt & Howlett

[57] ABSTRACT

A ganging clip (10) is adapted to mount to a pair of neighboring work surface support brackets (12) to secure together the work surfaces (14) mounted thereto and to adjust the relative heights of the work surfaces (14). The clip (10) comprises a central portion (36) and a pair of end portions (38) positioned in overlapping relationship to the central portion (36) so as to form a pair of resilient jaws (52) having extending therethrough a pair of screws (56). The jaws (52) are adapted to engage a pair of opposing horizontal legs (32) of the support brackets (12). Tightening of the screws (56) results in closing of the jaws (52) to securely clamp the clip (10) to the support brackets (12) and thus to secure together the work surfaces (14) mounted thereto. The relative heights of the work surfaces (14) may be subsequently adjusted by tightening or loosening either of the screws (56).

14 Claims, 2 Drawing Sheets

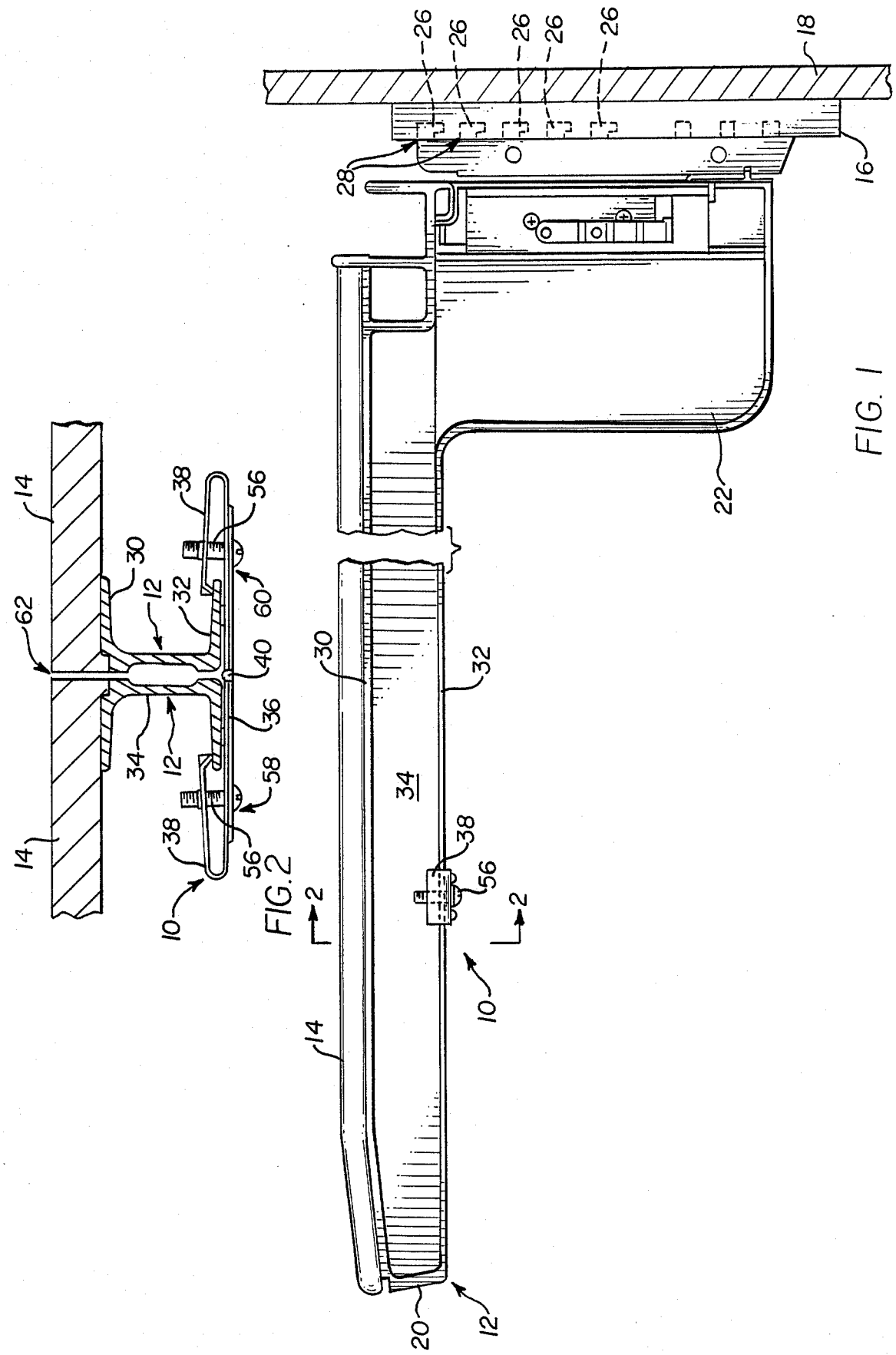

WORK SURFACE GANGING CLIP

This is a continuation of application Ser. No. 860,095, filed May 6, 1986.

FIELD OF THE INVENTION

This invention relates to a device for joining a pair of work surfaces, mounted to a wall, in load transmitting relationship. More particularly, the invention pertains to a device adapted to mount to a pair of neighboring work surface support brackets, mounted to a wall, to join the work surfaces secured thereto in spaced apart and load transmitting relationship and to adjust the relative heights of the work surfaces.

BACKGROUND OF THE INVENTION

In modern office designs, it is desirable to have furniture, such as work surfaces, removably mounted to the interior walls of a building and/or the freestanding walls of the so-called "open plan" office system in order to efficiently utilize a given amount of office space. To this end, work surfaces and the like, or supporting brackets to which the same are attached, are provided, on the rear portions thereof, with hooks or tabs adapted to engage vertical slotted standards rigidly secured to the interior or freestanding walls. It is also desirable to mount two or more work surfaces to a wall in side-by-side relationship and in the same horizontal plane. In this manner, one large work surface is formed, thereby providing a worker with greater work space, which is useful when, for example, a worker is required to lay on the work surface many documents for comparison purposes.

One inherent problem in mounting work surfaces in juxtaposed relationship is that the work surfaces having exerted thereon different loads are uneven, resulting in a visual problem. To circumvent this problem, devices securely interlocking the neighboring work surfaces, or the support brackets mounting the same, have been employed. These devices function as load equalizers to secure the work surfaces together in load transmitting relationship. Thus, if a force is exerted on one work surface, it will not be in part transmitted to the adjacent work surface.

For example, the U.S. Pat. No. to Brecher, 4,366,758, issued Jan. 4, 1983, discloses a device for joining a pair of tabletops together in end-to-end juxtaposition. The device comprising one brace rigidly secured at its top portion to the underside of one tabletop, and another brace rigidly secured at its top portion to the underside of the other tabletop. Both braces are rigidly secured together at their bottom portions. The braces are also connected to a support bracket common to both tabletops. In this manner, a rigid joint is created between the adjoining tabletops.

In addition, the U.S. Pat. No. to Larrea, 4,435,935, issued Mar. 13, 1984, discloses a device for joining a pair of panels and comprising a pair of resilient brackets positioned in grooves within adjacent sides of the panels in such a manner as to urge the panels together. A pair of bolts extend through the brackets and the panels on each side of the joint to securely join the panels. A pair of resilient joint covers are biased within the grooves to cover each side of the joint.

The U.S. Pat. No. to Scott, 3,594,028, issued July 20, 1971, discloses a pair of resilient clips for joining a pair of neighboring panels having a series of channels with restricted throats formed near the adjoining edges of the panels. Each clip has a central web portion and a tubular flange on each end of the web. One resilient clip is received within the channels on one side of the adjoining panels such that the tubular flanges snap over the restricted throats. The other resilient clip snap fits into the channels on the other side of the panels. The clips urge the panels together to form a tight joint between the same.

The foregoing devices, however, do not solve another problem associated with mounting work surfaces in side-by-side relationship to a wall. When so mounting work surfaces it is often difficult, if not impossible, to mount the work surfaces in the same horizontal plane. The result is an overall uneven work surface. This problem is the result of manufacturing tolerances in the work surfaces supporting elements, such as the vertical standards and the work surface support brackets, and human error in mounting the standards to the wall and assembling the supporting elements.

In view of the foregoing problems, it has been found desirable to provide a device which not only secures neighboring work surfaces together in load transmitting relationship, but also provides for vertical adjustment of the relative heights of the work surfaces.

SUMMARY OF THE INVENTION

According to the invention, a clip is provided for mounting to first and second support brackets to secure work surfaces mounted thereto in load-transmitting relationship, wherein the first and second support brackets are mounted to a wall in side-by-side relationship and have opposed first and second substantially horizontal legs. The clips comprise a clamp means adapted to securely clamp to the first horizontal legs, a securing means connected to the clamp means and adapted to secure the first and second work surfaces together in load-transmitting relationship and an adjustment means connected to the clamp means and adapted to vertically adjust the height of the securing means relative to the clamp means to adjust the relative height of the first and second work surfaces.

The clamp means preferably comprises a first lower portion, a first upper portion connected to the lower portion, a first pin extending through the first upper and lower portions and a first means on the first pin, engaging the first upper and lower portions, for drawing the first upper and lower portions toward each other to secure the first horizontal leg between the first upper and lower portions. The securing means preferably comprises an elongated flange connected to the first lower portion and adapted to engage the second horizontal leg and a second pin extending through the elongated flange and adapted to secure the elongated flange to the second horizontal leg and thereby secure the first and second work surfaces in load-transmitting relationship. The adjustment means comprises a first pivot means connected to the first lower portion engaging the first horizontal leg and permitting pivoting of the first lower portion with respect to the first horizontal leg. Tightening of the first drawing means causes the first lower portion to deflect upwardly and to pivot on the first pivot means and forces the elongated flange to deflect downwardly with respect to the first lower portion, thereby lowering the second work surface relative to the first work surface. The clip further comprises a stiffening means for rigidify the first and second lower portions to resist deflection of the first and second lower portions with respect to each other. A locating means is typically provided for centering the clip with respect to the first and second support brackets when mounting the clip to the support brackets.

Preferably, the pivot means comprises a first embossment formed integral with and extending along a substantially transverse axis to the first lower portion and the second pivot means comprises a second embossment formed integral with and extending along a substantially transverse axis of the second lower portion.

In a preferred embodiment of the invention, the pin comprises a machine screw having a head which bears against the lower portion and is threaded into a threaded hole in the upper portions of the clip.

The invention also relates to an office system having first and second support brackets mounted to a wall in side-by-side relationship and having opposed first and second substantially horizontal legs. First and second work surfaces are secured to the brackets and are supported thereby. A ganging clip means is mounted securely to the first and second horizontal legs to secure the first and second work surfaces together in load-transmitting relationship.

BRIEF DESCRIPTION OF THE DRAWINGS

The invention will now be described with reference to the drawings in which:

FIG. 1 is a side-elevational view of work surfaces secured to support brackets mounted to a wall and having mounted thereto a ganging clip according to the invention;

FIG. 2 is a cross-sectional view of the work surfaces and support brackets taken along lines 2—2 of FIG. 1;

DESCRIPTION OF THE PREFERRED EMBODIMENTS

Figure 3:
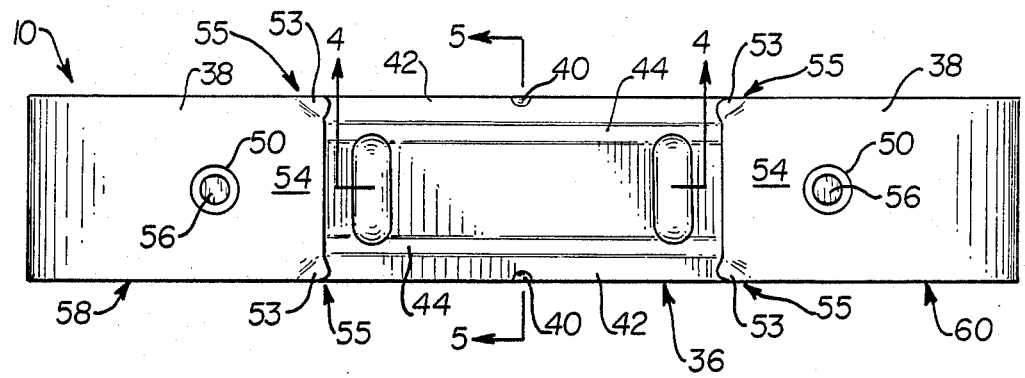
FIG. 3 is a top-elevational view of the ganging clip shown in FIGS. 1 and 2.
Figure 4:
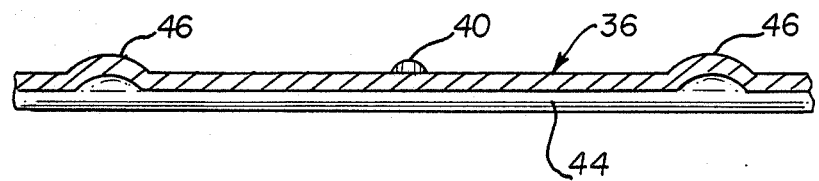
FIG. 4 is a cross-sectional view of the ganging clip taken along lines 4—4 of FIG. 3.
Figure 5:
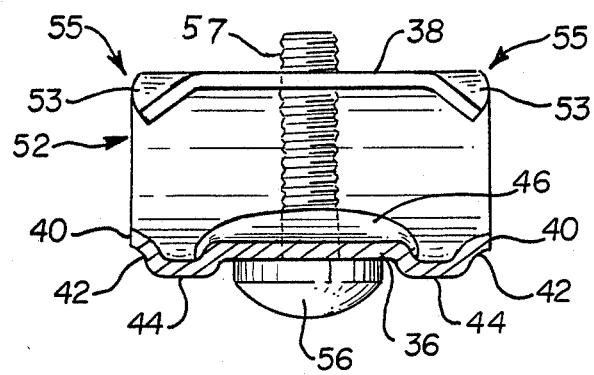
FIG. 5 is a cross sectional-view of the ganging clip taken along lines 5—5 of FIG. 3.
Figure 6:
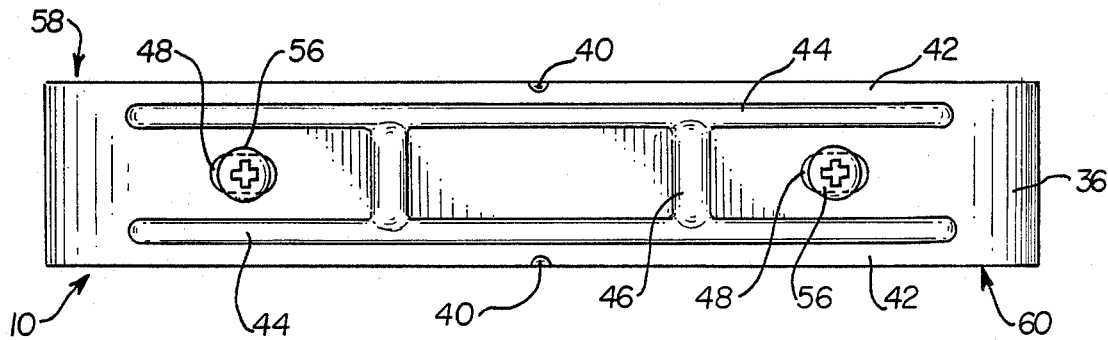
FIG. 6 is a bottom view of the ganging clip shown in FIGS. 1 through 5.

Referring to the drawings in detail, there is shown a ganging clip 10 mounted to a pair of neighboring work surface support brackets 12 to join work surfaces 14 secured thereto in load transmitting relationship and to adjust the relative heights of the work surfaces to thus position the same in substantially the same horizontal plane.

As shown in FIGS. 1 and 2, a pair of work surfaces 14 are supported by a pair of support brackets 12 securely mounted to a wall. The work surface support brackets 12 utilized in connection with the invention are of the type mountable to vertical slotted standards 16 securely attached to a wall 18, or other similar support surface. To this end, each support bracket 12 includes a horizontally disposed work surface support arm 20 and a vertical arm 22 having on the inner end 24 thereof a plurality of rearwardly and downwardly depending hooks 26 removably received within slots 28 of the vertical standard 16. In addition, the work surface support arm 20 of the support bracket 12 is U-shaped, in cross section, and has an upper horizontal leg 30, a lower horizontal leg 32 and a vertical leg 32 and a vertical leg 34 connected to and between upper and lower horizontal legs. The work surface 14 is rigidly secured to the upper horizontal leg 30 of the support bracket 12.

The ganging clip 10 is adapted to mount to a pair of neighboring work surface support brackets 12. As illustrated in FIG. 2, when mounted to the wall 18, the vertical legs 34 of the support brackets 12 are juxtaposed in side by side and spaced-apart relationship and the upper and lower horizontal legs, 30 and 32, are positioned in opposite directions and in substantially the same horizontal planes. Specifically, the ganging clip 10 is adapted to mount to the opposed lower horizontal legs 32 of the neighboring support brackets 12.

The ganging clip 10 comprises an enlongated rectangular plate having a central web portion 36 and a pair of identical end portions 38. The web portion 36 includes a pair of locating notches 40 formed integral with longitudinal sides 42 of the web and aligned along a central transverse axis of the same. In addition, the web portion 36 has a pair of stiffening ribs 44 formed integral with and positioned along longitudinal axes of the web. Further, a pair of fulcrums 46 are formed integral with the web portion on opposite sides of the locating notches 40. It is contemplated that the notches 40, stiffening ribs 44 and fulrums 46 can be rigidly secured to central web portion 36. A pair of openings 48 extend through the web portion 36 on opposite sides of the central transverse axis of the same. The functions of the fulcrums 46 and the ribs 44 will be hereinafter explained in more detail when describing the operation of the ganging clip 10.

Each end portion 38 includes a threaded hole 50 extending therethrough. The end portions 38 are bent backwardly and positioned in overlapping relationship with respect to the central web portion 36 such that holes 50 of the web portion 36 are aligned with openings 48 of the end portions. In this manner, end portions 38 and the web portion 36 form a pair of opposing resilient jaws 52. In addition, the corners 53 of the free ends 54 of the end portions 38 are bent downwardly to form a pair of teeth 55 on each jaw 52. A pair of threaded screws 56 having threads 57 are adapted to extend through the openings 48 and threadably engage the holes 50. Torquing the screws 56 results in the drawing together of the end portions 38 and the web portion 36 and thus the closing of the jaws 52. In the same manner, loosening of the screws 56 results in opening of the jaws 52.

For convenience in understanding the operation of the ganging clip 10, the clip will hereinafter be referred to as having a first side 58 and a second side 60. To mount the ganging clip 10 to the neighboring support brackets 12, the jaws 52 are set in registry with the lower horizontal legs 32 of the support brackets 12 such that the locating notches 40 of the web portion 36 are centered with respect to the neighboring support brackets and the lower legs of the support brackets rest on the fulcrums 46 of the web. Subsequently, the adjacent support brackets 12 and the work surfaces 14 secured thereto are manually adjusted laterally so as to make gap 62 between them substantially uniform along the full length of the horizontal support arms 20 of the support brackets. The screws 56 are then tightened to clamp the lower horizontal legs 32 of the ganging clip 10 between the web and end portions, 36 and 38, of the clip and to secure the above-described uniform spacing between the work surfaces 14. The disposition of the ganging clip 10 mounted on the support brackets 12 as just described is best illustrated in FIG. 2. The clamping action of the jaws 52 causes the teeth 55 of the same to securely bite into the lower horizontal legs 32 of the support brackets 12 to thereby securely join the neighboring work surfaces 14 in load transmitting relationship. In this manner, the ganging clip 10 functions as a load equalizer so that if a force is exerted on one work surface 14 it will not move relative to the other. Rather, both work surfaces will move as a single unit.

The relative heights of the work surfaces 14 can be subsequently adjusted by further tightening or loosening of either of the screws 56. For example, further torquing of screw 56 of the first side 58 of the clip 10, results in downward movement of the web portion of the second side 60 of the clip. As the second side 60 moves downwardly, its corresponding work surface also moves downwardly with respect to the adjacent work surface. In the same manner, loosening of screws 56 of the first side 58 causes the work surface 14 associated with the second side 60 of the clip 10 to move upwardly relative to its neighboring work surface. Similarly, tightening and loosening of screw 56 of the second side 60 causes the work surface 14 associated with the first side 58 of the clip to move downwardly and upwardly, respectively, relative to the work surface associated with the second side. Manipulation of the screws 56 as described above allows workers to vertically adjust the neighboring work surfaces 14 so as to position the same in substantially the same horizontal plane.

The fulcrums 46 and the stiffening ribs 44 play an important role in the above-described adjustment feature of the ganging clip 10. When the ganging clip 10 is securely mounted to the neighboring support brackets 12, the lower horizontal legs 32 of the brackets securely engage on the fulcrums 46. In addition, when, for example, the screw 56 of the first side 58 of the clip 10 is tightened the web portion 36 of the first side bends to assume a concave shape and pivots about its respective fulcrum 46. This causes the web portion 36 of the second side 60 to deflect downwardly and the lower horizontal leg 32 of the support bracket associated with the second side to pivot laterally on its respective fulcrum 46 to thereby lower the support bracket, and the work surface attached thereto, relative to the support bracket of the first side of the clip.

The stiffening ribs 44 function to add rigidity to the central web portion 36 of the clip 10, along longitudinal axes thereof. By adding rigidity to the clip 10, the ribs 44 limit the amount of deflection of the web portion 36 when either of the screws 56 are tightened, as a result of adjustment of the relative heights of the work surfaces, to thereby prevent permanent deflection of the web portion 36 subsequent to bending. Thus, for example, upon loosening of the screw 56 of the first side 58, the second side 60 of the clip 10 resiliently responds and deflects upwardly to raise its corresponding work surface 14 relative to the neighboring work surface.

In addition, since deflection of the web portion 36 is limited, the web is better able to transmit force, from either end of the clip 10 to the other, generated when either of the screws 56 are tightened. Thus, for example, when screw 56 of the first side 58 is tightened and the web portion 36, of the second side 60 bends downwardly, the force necessary to lower the work surface 14 of the second side is transmitted from the first side to the second side of the clip. The stiffening ribs 44, by limiting the amount of deflection of the second side 60 of the clip 10, enable the central portion to optimally transfer the forces required to lower the work surface 14 of the second side relative to the first side.

In the preferred embodiment, the ganging clip 10 is constructed of a spring temper steel so that the clip will not yield when portions of the same are deflected in operation. For example, the ganging clip 10 may be constructed of a heat-treated spring steel having a thickness of approximately 0.0568 to 0.0635 inches; SAE 1050 and 1075 steel; and a hardness of R35 (Rockwell) to R42 (Rockwell). Alternatively, the clip 10 can be made out of a high-strength low alloy steel.

While the invention will be described in connection with a preferred embodiment, it will be understood that we do not intend to limit the invention to that embodiment. To the contrary, we intend to cover all alternatives, modifications and equivalents as may be included within the spirit and scope of the invention as defined by the appended claims.

The embodiments of the invention in which an exclusive property or privilege is claimed are defined as follows:

1. A clip adapted to mount to first and second support brackets to secure first and second work surfaces mounted thereto in load transmitting relationship, said first and second support brackets being mounted to a wall in side-by-side relationship and having opposed first and second substantially horizontal legs, wherein said clip comprises:

a clamp means comprising a first lower portion, a first upper portion connected to said first lower portion, a first pin extending through said first upper and lower portions and a first drawing means on said first pin, engaging said first upper and lower portions and for drawing said first upper and lower portions toward each other to secure said first horizontal leg between said first upper and lower portions;

a securing means comprising a second lower portion connected to said first lower portion, a second upper portion connected to said second lower portion, a second pin extending through said second lower and upper portions and a second drawing means on said second pin, engaging said second upper and lower portions and for drawing said second upper and lower portions toward each other to secure said second horizontal leg between said second upper and lower portions to secure said first and second work surfaces together in load transmitting relationship; and an adjustment means comprising a first pivot means connected to said first lower portion, engaging said first horizontal leg and positioned on said first lower portion so as to provide a fulcrum for bending and pivoting of said first lower portion with respect to said first horizontal leg;

whereby tightening said first drawing means causes said first lower portion to deflect upwardly and to bend and pivot about said first pivot means thereby forcing said second lower portion to deflect downwardly, with respect to said first lower portion, to exert a force tending to lower said second work surface relative to said first work surface.

2. A clip according to claim 1, wherein said adjustment means further comprises a second pivot means connected to said second lower portion, engaging said second horizontal leg and positioned on said second lower portion so as to provide a fulcrum for bending and pivoting of said second lower portion with respect to said second horizontal leg;

whereby tightening of said second drawing means causes said second lower portion to deflect upwardly and to pivot on said second pivot means and said first lower portion to deflect downwardly, with respect to said second lower portion, to lower said first work surface relative to said second work surface.

3. A clip according to claim 2, wherein said clip further comprises a stiffening means for rigidifying said first and second lower portions to resist deflection of said first and second lower portions with respect to each other.

4. A clip according to claim 3, wherein said clip further comprises a locating means for centering said clip with respect to said first and second support brackets when mounting said clip to said support brackets.

5. A clip according to claim 4, wherein said first pivot means comprises a first embossment formed integral with and extending along a substantially transverse axis of said first lower portion; and said second pivot means comprises a second embossment formed integral with and extending along a substantially transverse axis of said second lower portion.

6. A clip according to claim 5, wherein said stiffening means comprises at least one stiffening rib formed integral with or rigidly secured to and extending along substantially longitudinal axes of said first and second lower portions.

7. A clip according to claim 6, wherein said locating means comprises at least one locating notch formed integral with or rigidly secured to said clip, positioned between said first and second lower portions and adapted to be positioned between said first and second support brackets when said clip is mounted to said first and second support brackets to center said clip with respect to said support brackets.

8. A clip according to claim 7, wherein said first and second upper portions comprise pairs of downwardly depending flanges positioned substantially perpendicular to said first and second horizontal legs and adapted to tightly engage said first and second horizontal legs when said first and second drawing means are tightened.

9. In an office system, the combination of first and second support brackets having first and second work surfaces secured thereto, mounted to a wall in side-by-side relationship and having opposed first and second substantially horizontal legs, and a ganging clip securely mounted to said first and second horizontal legs to secure said first and second work surfaces together in load transmitting relationship, wherein the improvement in said ganging clip comprises:

a clamp means comprising a first lower portion, a first upper portion connected to said first lower portion, a first pin extending through said first upper and lower portions and a first drawing means on said first pin, engaging said first upper and lower portions and for drawing said first upper and lower portions toward each other to secure said first horizontal leg between said first upper and lower portions;

a securing means comprising a second lower portion connected to said first lower portion, a second upper portion connected to said second lower portion, a second pin extending through said second lower and upper portions and a second drawing means on said second pin, engaging said second upper and lower portions and for drawing said second upper and lower portions toward each other to secure said second horizontal leg between said second upper and lower portions to secure said first and second work surfaces together in load transmitting relationship; and an adjustment means comprising a first pivot means connected to said first lower portion, engaging said first horizontal leg and so positioned on said first lower portion to provide a fulcrum for bending and pivoting of said first lower portion with respect to said first horizontal leg;

whereby tightening of said first drawing means causes said first lower portion to deflect upwardly and to bend and pivot about said first pivot means thereby forcing said second lower portion to deflect downwardly, with respect to said first lower portion, to exert a force tending to lower said second work surface relative to said first work surface.

10. The combination according to claim 7, wherein said adjustment means further comprises a second pivot means connected to said second lower portion, engaging said second horizontal leg and positioned on said section lower portion so as to provide a fulcrum for bending and pivoting of said second lower portion with respect to said second horizontal leg;

whereby tightening of said second drawing means causes said second lower portion to deflect upwardly and to pivot on said second pivot means and said first lower portion to deflect downwardly, with respect to said second lower portion, to lower said first work surface relative to said second work surface.

11. A combination according to claim 10, wherein said clip further comprises a stiffening means for rigidifying said first and second lower portions to resist deflection of said first and second lower portions with respect to each other.

12. A combination according to claim 11, wherein said clip further comprises a locating means for centering said clip with respect to said first and second support brackets when mounting said clip to said support brackets.

13. The combination according to claim 12, wherein said first pivot means comprises a first embossment formed integral with and extending along a substantially transverse axis of said first lower portion;

said second pivot means comprises a second embossment formed integral with and extending along a substantially transverse axis of said second lower portion;

said stiffening means comprises at least one stiffening rib formed integral with or rigidly secured to and extending along substantially longitudinal axes of said first and second lower portions;

said locating means comprises at least one locating notch formed integral with or rigidly secured to said clip, positioned between said first and second lower portions and adapted to be positioned between said first and second support brackets when said clip is mounted to said first and second support brackets to center said clip with respect to said support brackets.

14. The combination according to claim 13, wherein said first and second upper portions comprise pairs of downwardly depending flanges positioned substantially perpendicular to said first and second horizontal legs and adapted to tightly engage said horizontal legs when said first and second drawing means are tightened.

* * * * *